US008146864B2

(12) United States Patent
Köppel et al.

(10) Patent No.: US 8,146,864 B2

(45) Date of Patent: Apr. 3, 2012

(54) LOCKING DEVICE FOR SLIDING DOORS OF AIRCRAFT, ESPECIALLY OF HELICOPTERS

(75) Inventors: Klaus Köppel, Asbach-Bäumenheim (DE); Alexander Rowbut, Aix-en-Provence (FR)

(73) Assignee: Eurocopter Deutschland GmbH, Donauwoerth (DE)

( * ) Notice: Subject to any disclaimer, the term of this patent is extended or adjusted under 35 U.S.C. 154(b) by 317 days.

(21) Appl. No.: 12/516,443

(22) PCT Filed: Nov. 26, 2007

(86) PCT No.: PCT/DE2007/002124

§ 371 (c)(1), (2), (4) Date: Nov. 25, 2009

(87) PCT Pub. No.: WO2008/064649

PCT Pub. Date: Jun. 5, 2008

(65) Prior Publication Data

US 2010/0064741 A1 Mar. 18, 2010

(30) Foreign Application Priority Data

Nov. 28, 2006 (DE) ......................... 10 2006 056 441

(51) Int. Cl.
*B64C 1/14* (2006.01)

(52) U.S. Cl. .................................................... 244/129.5

(58) Field of Classification Search ............... 244/129.4, 244/129.5; 49/449

See application file for complete search history.

(56) References Cited

U.S. PATENT DOCUMENTS

| | | | | |
|---|---|---|---|---|
| 4,494,782 | A | 1/1985 | Lutz | |
| 4,593,945 | A | 6/1986 | Arute et al. | |
| 5,673,874 | A * | 10/1997 | Howard | 244/129.5 |
| 6,325,428 | B1 * | 12/2001 | Do | 292/113 |
| 7,290,736 | B2 * | 11/2007 | Pahl | 244/129.5 |

FOREIGN PATENT DOCUMENTS

| | | |
|---|---|---|
| DE | 37 07 324 | 9/1988 |
| DE | 93 11 255 | 12/1994 |
| FR | 2 524 082 | 9/1983 |

OTHER PUBLICATIONS

International Search Report dated Jun. 18, 2008, from corresponding PCT application.

* cited by examiner

*Primary Examiner* — Joshua J Michener
*Assistant Examiner* — Keith L Dixon
(74) *Attorney, Agent, or Firm* — Brooks Kushman P.C.

(57) ABSTRACT

A locking device having a door catch system for helicopter doors, which are embodied as sliding doors, which are to be additionally moved (flush-fitted) into the closed position at right angles to the plane of the door opening in response to their closing movement, consisting of a catch (15*a*), which is associated with the latch (13) and which is in active connected therewith, by which catch (15*a*) the sliding door is "caught" directly in front of its locked position in response to a manual closing process until the sliding door has been transferred into its final closed position via the latch (13).

7 Claims, 2 Drawing Sheets

LOCKING DEVICE FOR SLIDING DOORS OF AIRCRAFT, ESPECIALLY OF HELICOPTERS

Figure 1:
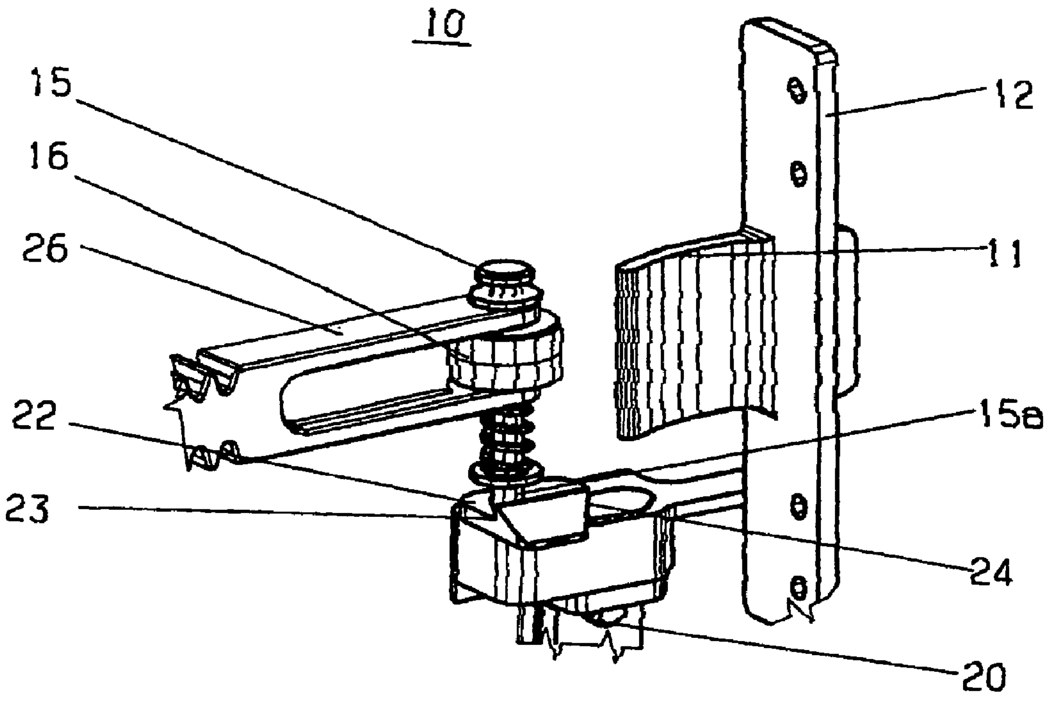

The invention relates to a locking device for sliding doors of aircrafts, in particular of helicopters, according to the preamble of patent claim 1.

Similarly as in land crafts, such sliding doors, which serve to allow the pilot to get on or the passengers to get on, are guided via lateral guide rails at a distance laterally along the outer surface of the fuselage structure up to the height of the door opening and are then pulled into the door opening via suitably bent ends of the guide rails. For this, the sliding door must be moved manually and must furthermore be locked manually in the closed position. Contrary to land crafts, the doors of aircrafts, which are present there within the openings, which are provided within the fuselage structure, must be flush-fitted and closed in an absolutely reliable manner. The closing of such sliding doors thus requires three consecutive manual operations, namely pulling the door closed, holding the door in this state and the subsequent locking thereof. For this, at least two door locks are connected to the door structure. The bolts of said door locks, which interact with brackets, which are fastened to the fuselage structure, can be operated together via suitable struts, which encompass a handle. When closing such doors, special skills are thus necessary for the last two operations, because the respective door must be held tight when locking in the closed position. In the event that the door has not been pushed closed to a sufficient extent, it can happen that the one or the other bolt "grasps at nothing" and the respective door is thus not closed correctly. Both hands of the respective person are thus typically required for closing the door.

The currently known door locks for such sliding doors are obviously not user-friendly. Even though there is sufficient space and elbowroom for the opening and closing of the door while standing in front of the helicopter and even though a pulling, holding, pushing and/or spinning can be carried out without greater difficulties, this will, however, change immediately after getting on and sitting down in the helicopter. Due to the limited ergonomics and due to the fact that pilot or passenger seats, e.g., are embodied so as to be adjustable forward and upward as a function of the body height, the operation of such doors is then made much more difficult.

The doors of a helicopter establish the first contact to the aircraft and thus determine the first impression for the respective operator. There is thus a requirement for doors to be embodied in a self-explanatory manner with reference to the operability and function thereof and for them not to already form the first manual and/or technical hurdle when getting onto the helicopter. The functions of the door lock should also be capable of being comprehended and operated in a logical manner by anyone without additional signposting and information.

A generic door locking system for a helicopter door having a translationally movable locking system is known from DE 3 707 324 A1. It has hereby proven to be disadvantageous that the helicopter door must be held tight when locking in the closed position so that both hands are required for locking the door.

A so-called run-out door, which assumes a pre-engagement position in response to a closing motion and prior to reaching the final closed position, is known from DE 9 311 255 U1, which relates to a door closing device for motor vehicles.

The invention is thus based on the object of creating a new door locking device, which can be operated to an improved extent as yet, while maintaining the closing safety.

Based on a translationally operable sliding door, which is guided by means of rails and has at least one latch, which engages behind an indentation and which is embodied as a toothed rack, this object according to the invention is solved by means of the characterizing features of patent claim 1.

Additional features of the invention result from the dependent claims.

The new door lock is surprisingly advantageous. That is to say that, before the latch becomes effective, the respective door, which is embodied as a sliding door, is "caught" in the position, in which the latch is only in the area of the indentations, with the help of the catch according to the invention, which is associated with the latch and actively connected therewith, so that, solely by further moving the latch in the closed position thereof, the door can be transferred into its final closed position without requiring a manual holding/pulling/pushing of the door into the opening, which is present in the fuselage structure. When transferring the latch into its final closed position by means of said handle, the catch is released again for a new closing process via the active connection between catch and latch, which is embodied as a sliding wedge according to the invention.

The embodiment of the door lock according to the invention considerably facilitates the secure closing of such sliding doors and thus increases the operating comfort for the crew of a helicopter. The ergonomic demands on the flight attendants during the flight of the helicopter with open sliding doors are considerably reduced for pushing closed the door in flight.

The invention will be described below by means of an exemplary embodiment, which is more or less schematically illustrated in the drawing.

Figure 2:
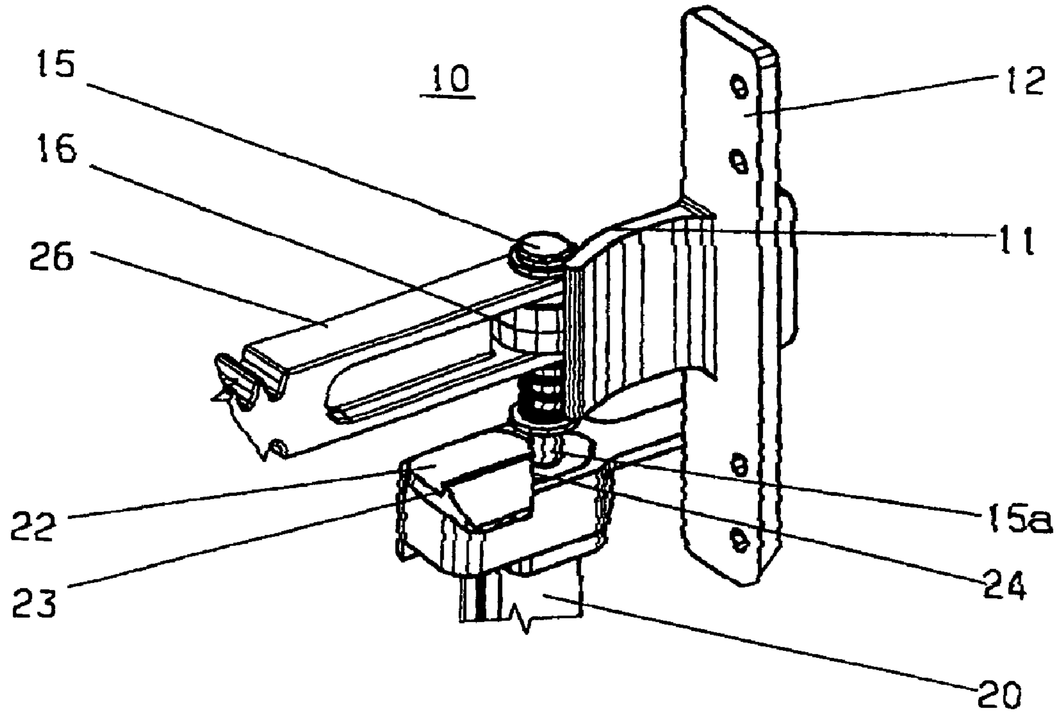
Figure 3:
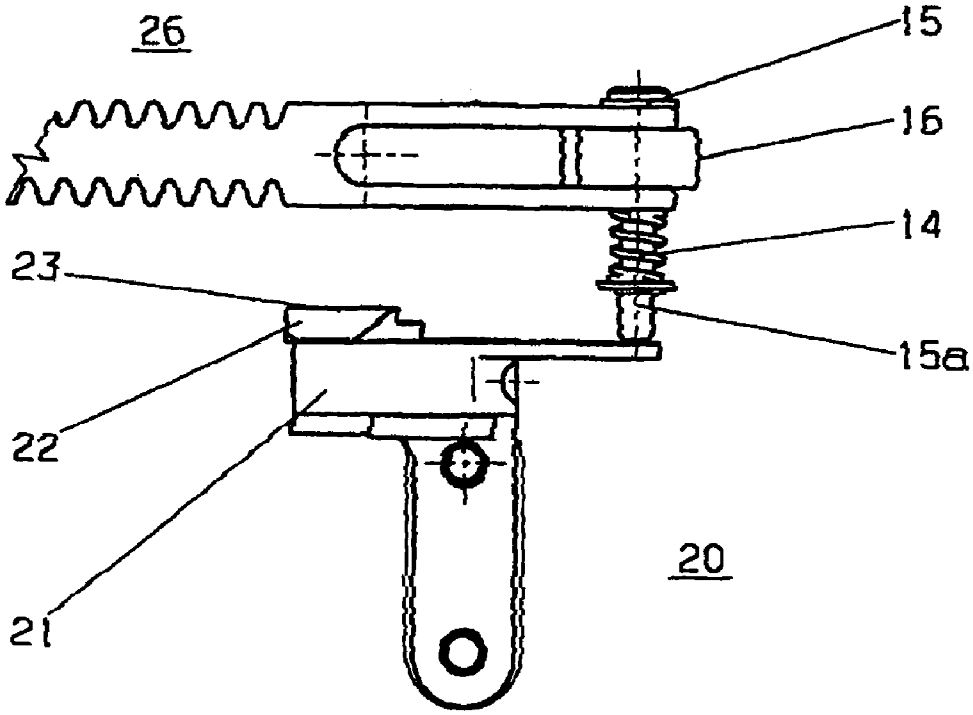
Figure 4:
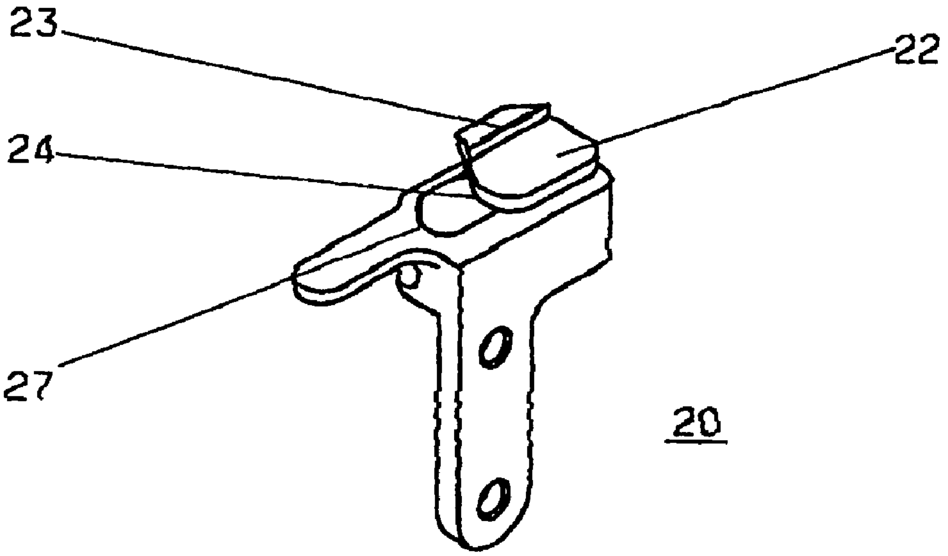

FIG. 1 shows an isometric view of a locking device according to the invention, which is provided for a sliding door of a helicopter, in the catch position, FIG. 2 shows the locking device according to FIG. 1 in the unlocked position, FIG. 3 shows a side view of the catch, which is connected to the latch of the locking device according to FIG. 1 in interaction with a door catch bracket and FIG. 4 shows the door catch bracket in isometric individual view.

Of a locking device for the non-illustrated sliding door of an aircraft, which is also not illustrated, in particular of a helicopter, FIGS. 1 to 4 only show one of the locking devices 10, which are fixedly connected to the sliding door. The locking devices are operated together via struts encompassing a hand lever, which is also not illustrated and interact in each case with a bracket 12, which is fastened to the fuselage structure of the aircraft and encompassing an indentation 11.

A toothed rack lock 26, at the effective end of which the sliding door can be locked via a roller 16, which is support there on a pin 15, which is acted upon by a spring 14 in axial direction. For this, the roller 16 engages behind the indentation 11 of the bracket 12, which is fastened to the fuselage structure, which is also not illustrated and which is located at the rear frame profile of the sliding door guide, which is also not illustrated. The free end 15*a* of the pin 15, which supports the roller 16, of the toothed rack lock 26, which can be seen from FIG. 3, serves as a catch. A door catch bracket 20, which is fastened on the fuselage structure at the rear door frame profile, is located in the area of the free end 15*a* of the pin 15 of the toothed rack lock 26 of the sliding door, which is guided laterally at a distance to the fuselage structure by means of guide rails. Said door catch bracket 20 comprises a slide block 22 being resiliently supported in a base 21 and having a catch bevel 23 at its surface and an opening bevel 24, which is associated with the side surface of the slide block facing away from the pin 15; see FIGS. 3 and 4. The slide block 22 is held so as to abut with the side surface 27 of the door catch bracket facing the pin 15 via a spring.

Due to the fact that the spring-loaded pin 14 of the toothed rack lock 26 is supported so as to be longitudinally movable in its axial direction, said pin 14 can move with its free end 15 via the catch bevel 23 of the slide block 22 when the sliding door is pushed closed manually, provided that the door catch bracket 20 is fastened to the fuselage structure so as to be oriented according to regulations with reference to the pin 15*a*. As mentioned, the sliding door is hereby moved against the door opening via its guide rails in the area of the door opening in the fuselage structure. Due to this movement, the sliding door thus gets caught behind the catch bevel 23 of the slide block 22 of the door catch bracket 20. The sliding door is "caught" in this position, it can thus no longer move back into the open position due to accelerations or declinations of the helicopter. The flush-fitting and locking of the sliding door in the door opening can now take place manually without holding the sliding door closed, in fact solely by moving the non-illustrated handle of the struts, which are connected to the toothed rack lock 26, into the closed position. The free end 15 of the pin 15*a* hereby moves in a resilient manner behind the opening bevel 24 of the slide block 22; see FIG. 2.

In response to the opening of the sliding door, thus after releasing the toothed rack lock 26, said sliding door is moved out of the door opening in its guide rails. The free end 15*a* of the pin 15 hereby pushes the slide block 22 across the opening bevel 24 in opposition to the force of the non-illustrated spring out of the guide track of the sliding door so that said sliding door is freely movable into the open position. After passing the sliding door, the slide block 22 assumes its "catch position" again because of the spring.

LIST OF REFERENCE NUMERALS

10 locking device
11 indentation
12 bracket
14 spring
15 pin
15*a* free end of 15
16 roller
20 door catch bracket
21 base
22 slide block
23 catch bevel
24 opening bevel
26 toothed rack lock
27 side surface of the door catch bracket

The invention claimed is:

1. A door locking device for translationally operable sliding doors of helicopters, comprising:

rails, having a toothed rack lock associated with a door structure and an indentation, which is associated with the fuselage structure and which can be engaged with the toothed rack lock as soon as the toothed rack lock is moved via manually operable struts into a closed position, in which the door is pulled into a door opening located in the fuselage structure and is locked in position or is unlocked, respectively, by moving the toothed rack lock into a release position, characterized in that a spring-loaded catch, which is associated with said toothed rack lock and which is actively connected therewith, is associated with said toothed lock rack, said catch being capable of being engaged with a slide block, which is supported in a door catch bracket for the purpose of catching the sliding door before the toothed lock rack becomes effective and the catch is capable of being released again by further moving the sliding door into its final closed position.

2. The door locking device according to claim 1, characterized in that the slide block, which serves as active connection between catch and latch, encompasses a catch bevel at its surface, which faces the catch, and an opening bevel at its side surface, which faces the catch and is held by means of a spring, so as to abut with the side surfaces of the door catch bracket, which faces the catch.

3. The door locking device according to claim 1, characterized in that the pin (15) of the latch (13), which carries the roller (13) and which is supported so as to be longitudinally movable, is acted upon by a spring (14) in axial direction.

4. The door locking device according to claim 1, characterized in that the slide block is capable of being moved out of the trajectory of the sliding door and the opening movement is thus capable of being released via the free end of the pin, which acts as a catch and which is in active connection with the opening bevel in response to the opening of the sliding door.

5. The door locking device according to claim 2, characterized in that the pin (15) of the latch (13), which carries the roller (13) and which is supported so as to be longitudinally movable, is acted upon by a spring (14) in axial direction.

6. The door locking device according to claim 2, characterized in that the slide block is capable of being moved out of the trajectory of the sliding door and the opening movement is thus capable of being released via the free end of the pin, which acts as a catch and which is in active connection with the opening bevel in response to the opening of the sliding door.

7. The door locking device according to claim 3, characterized in that the slide block is capable of being moved out of the trajectory of the sliding door and the opening movement is thus capable of being released via the free end of the pin, which acts as a catch and which is in active connection with the opening bevel in response to the opening of the sliding door.

* * * * *